United States Patent
Matoba et al.

(10) Patent No.: US 11,275,887 B2
(45) Date of Patent: Mar. 15, 2022

(54) NON-TRANSITORY COMPUTER-READABLE RECORDING MEDIUM, EVALUATION METHOD, AND INFORMATION PROCESSING DEVICE

(71) Applicant: FUJITSU LIMITED, Kawasaki (JP)

(72) Inventors: Yuki Matoba, Machida (JP); Masahiro Kataoka, Kamakura (JP); Yasunari Tateiwa, Izunokuni (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/166,463

(22) Filed: Feb. 3, 2021

(65) Prior Publication Data
US 2021/0157971 A1  May 27, 2021

Related U.S. Application Data

(63) Continuation of application No. PCT/JP2018/029471, filed on Aug. 6, 2018.

(51) Int. Cl.
*G06F 17/00* (2019.01)
*G06F 40/12* (2020.01)
(Continued)

(52) U.S. Cl.
CPC .............. *G06F 40/12* (2020.01); *G06F 40/30* (2020.01); *G06F 40/268* (2020.01); *H04L 51/02* (2013.01)

(58) Field of Classification Search
CPC ........ G06F 40/12; G06F 40/30; G06F 40/268; G06F 40/284; G06F 16/3329; G06F 16/24522; H04L 51/02
See application file for complete search history.

(56) References Cited

U.S. PATENT DOCUMENTS

| | | | |
|---|---|---|---|
| 8,983,962 B2* | 3/2015 | Nakazawa | G06F 16/3329 707/738 |
| 9,697,477 B2* | 7/2017 | Oh | G06N 20/00 |

(Continued)

FOREIGN PATENT DOCUMENTS

| | | |
|---|---|---|
| JP | 2001-014337 A | 1/2001 |
| JP | 2001-022763 A | 1/2001 |

(Continued)

OTHER PUBLICATIONS

Yang, Sheng-Yuan, "Developing an Ontological FAQ System with FAQ Processing and Ranking Techniques for Ubiquitous Services", Department of Computer and Communication Engineering, St. John's University, Jul. 1, 2008, DOI: 10.1109/UMEDIA.2008.4570950, pp. 541-546 (Year: 2008).*

(Continued)

*Primary Examiner* — Laurie A Ries
(74) *Attorney, Agent, or Firm* — Fujitsu Patent Center

(57) ABSTRACT

The information processing device receives question information, converts words contained in the received question information into word vectors including a plurality of element values respectively associated with a plurality of elements. The information processing device refers to the memory that stores, in association with the elements, specific information specifying the strength of specific meanings contained within the element values associated with the elements and acquires, using the specific information, a plurality of semantic information items indicating the strength of the specific meanings respectively contained within the plurality of element values included in the word vectors. The information processing device performs an evaluation relating to the received question information on the basis of the acquired plurality of semantic information items.

4 Claims, 12 Drawing Sheets

(51) Int. Cl.
    *G06F 40/30*     (2020.01)
    *G06F 40/268*     (2020.01)
    *H04L 51/02*     (2022.01)

(56) References Cited

U.S. PATENT DOCUMENTS

| | | | | |
|---|---|---|---|---|
| 10,382,379 | B1* | 8/2019 | Zhang | G06Q 10/107 |
| 10,755,177 | B1* | 8/2020 | Dabney | G06N 5/022 |
| 10,978,056 | B1* | 4/2021 | Chai | G06N 20/00 |
| 2015/0134336 | A1* | 5/2015 | Huang | G06F 16/36 704/254 |
| 2016/0217129 | A1* | 7/2016 | Lu | G06F 16/36 |
| 2017/0085509 | A1* | 3/2017 | Fernandez | H04L 67/26 |
| 2017/0091175 | A1* | 3/2017 | Kanayama | G06F 40/58 |
| 2017/0180284 | A1* | 6/2017 | Smullen | H04L 67/306 |
| 2017/0206897 | A1* | 7/2017 | Jiang | G06F 40/211 |
| 2017/0371861 | A1* | 12/2017 | Barborak | G06N 3/006 |
| 2018/0232437 | A1* | 8/2018 | English | G06F 16/3344 |
| 2018/0336183 | A1* | 11/2018 | Lee | G06N 3/0454 |
| 2018/0365321 | A1* | 12/2018 | Ke | G06N 3/0445 |
| 2019/0065576 | A1* | 2/2019 | Peng | G06F 16/22 |
| 2019/0188590 | A1* | 6/2019 | Wu | H04L 51/02 |
| 2019/0260694 | A1* | 8/2019 | Londhe | G06N 20/00 |
| 2020/0034722 | A1* | 1/2020 | Oh | G06F 16/3334 |

FOREIGN PATENT DOCUMENTS

| | | |
|---|---|---|
| JP | 2007-148661 A | 6/2007 |
| JP | 2012-088893 A | 5/2012 |
| JP | 2013-171550 A | 9/2013 |
| JP | 2015-032193 A | 2/2015 |

OTHER PUBLICATIONS

International Search Report and Written Opinion of the International Searching Authority (Form PCT/ISA/210, 220, and 237), mailed in connection with PCT/JP2018/029471 and dated Oct. 30, 2018 (Total 8 pages).

* cited by examiner

FIG.1
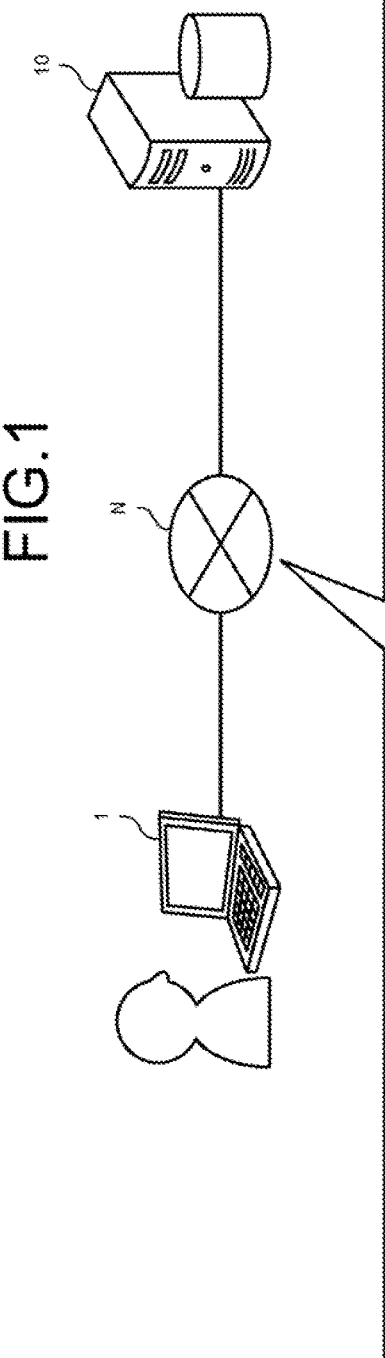
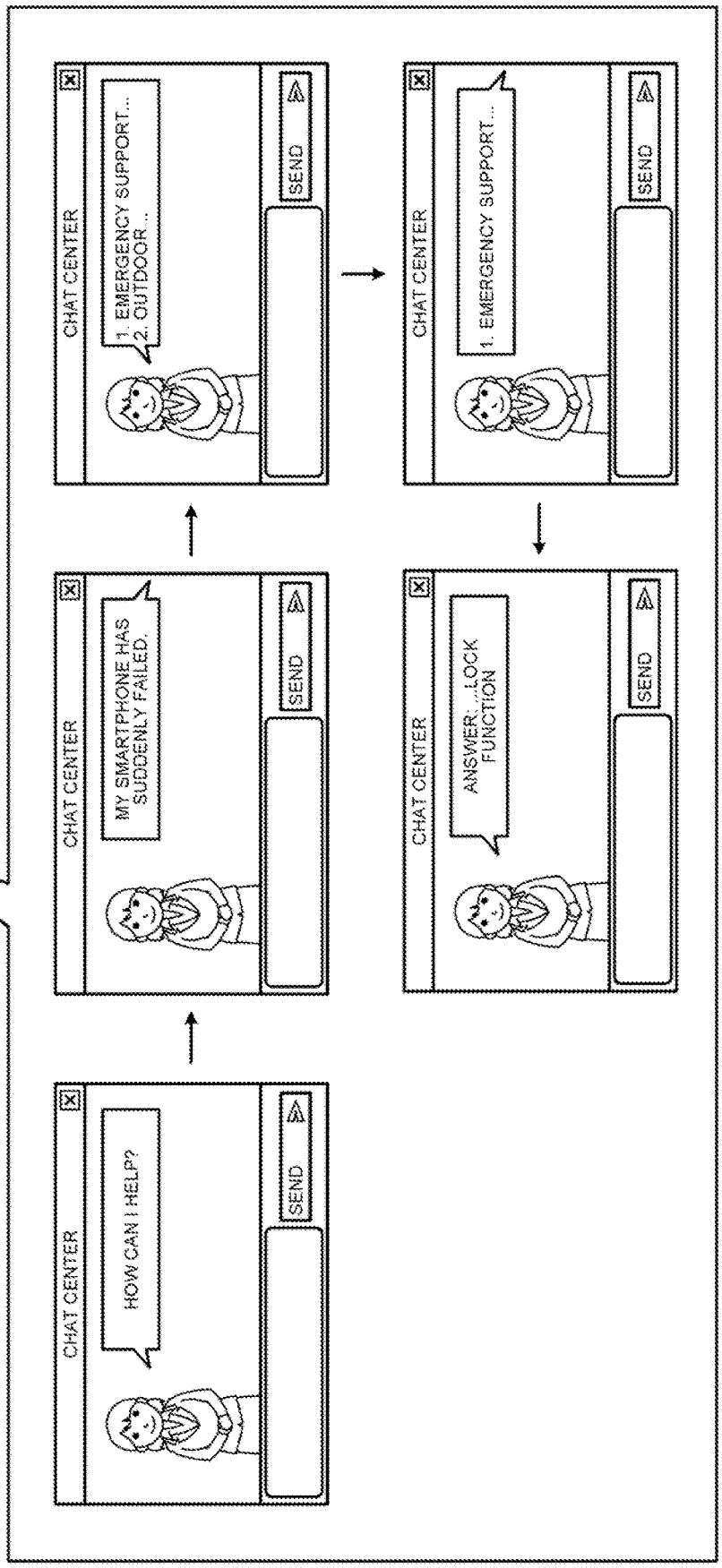

FIG.3

| FAQ_ID | CATEGORY | QUESTION | ANSWER |
|---|---|---|---|
| 1 | MEMBERSHIP | MEMBERSHIP FEE | MEMBERSHIP FEE IS 1000 YEN PER MONTH |
| 2 | FAILURE | CONTENT REGARDING COMPENSATION FOR SMARTPHONE FAILURE WHEN DROPPED | COMPENSATION CAN BE PROVIDED WITHIN WARRANTY PERIOD BUT WILL BE PAID FOR BEYOND WARRANTY PERIOD. HOWEVER,... |
| ... | ... | ... | ... |

NON-TRANSITORY COMPUTER-READABLE RECORDING MEDIUM, EVALUATION METHOD, AND INFORMATION PROCESSING DEVICE

CROSS-REFERENCE TO RELATED APPLICATION

This application is a continuation of International Application No. PCT/JP2018/029471, filed on Aug. 6, 2018, the entire contents of which are incorporated herein by reference.

FIELD

The embodiments discussed herein are related to an evaluation program, an evaluation method, and an information processing device.

BACKGROUND

Conventionally, a staffed system such as a call center is used that, upon receiving telephone calls, emails, and the like, responds to inquiries from end users regarding mail orders, online sales, or online games, or the like, and inquiries from administrators about system failures and so forth. Furthermore, a frequently asked questions (FAQ) system in a computer chat format is utilized so as to be able to respond to inquiries from an end user or an administrator, or the like, even outside of staffed business hours. In recent years, technology has become known that performs a morphological analysis on a query which is inputted from a person asking a question, and if lacking, questions the person asking the question further about nouns and so forth, and responds by selecting an answer that corresponds to the supplemented information.

[Patent Literature 1] Japanese Laid-open Patent Publication No. 2013-171550.

[Patent Literature 2] Japanese Laid-open Patent Publication No. 2015-032193.

[Patent Literature 3] Japanese Laid-open Patent Publication No. 2001-022763.

SUMMARY

According to an aspect of the embodiments, a non-transitory computer-readable recording medium stores therein an evaluation program that causes a computer to execute a process. The process includes receiving question information, converting words contained in the received question information into word vectors including a plurality of element values respectively associated with a plurality of elements, referring to a storage unit that stores, in association with the elements, specific information specifying the strength of specific meanings contained within the element values associated with the elements and acquiring, using the specific information, a plurality of semantic information items indicating the strength of the specific meanings respectively contained within the plurality of element values included in the word vectors, and performing an evaluation relating to the received question information on the basis of the acquired plurality of semantic information items.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a diagram illustrating a FAQ system according to a first embodiment;

FIG. 3 is a diagram illustrating an example of information stored in a FAQ list database (DB);

DESCRIPTION OF EMBODIMENTS

Figure 2:
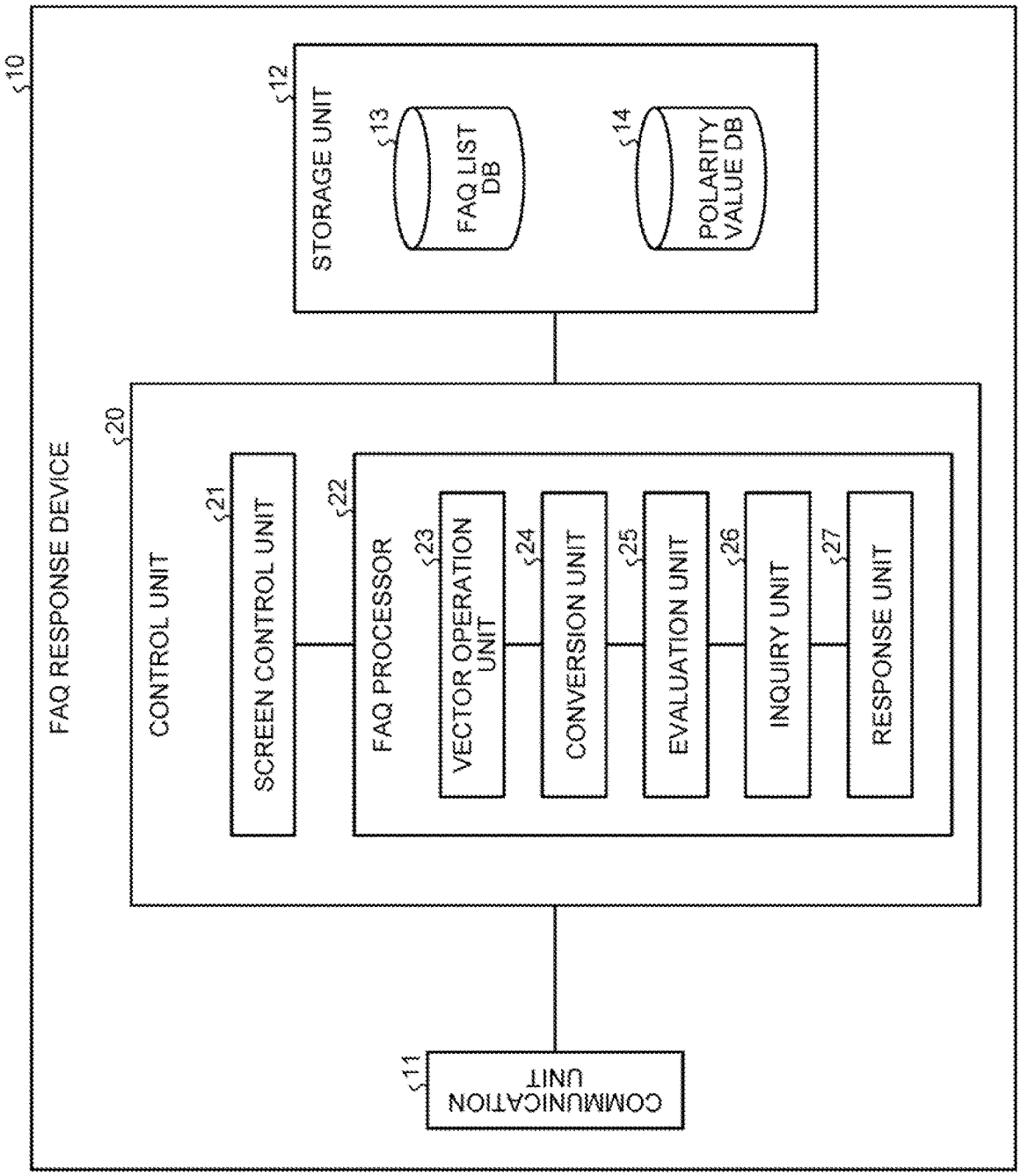
FIG. 2 is a functional block diagram illustrating a function configuration of a FAQ response device according to the first embodiment.

With the foregoing technology, because an answer is made after the query has been supplemented with nouns, there is an increased number of nouns in the supplemented query, and so forth, and the content of the query is all the more complex, the question accuracy is reduced, and thus an erroneous answer is sometimes sent back.

Preferred embodiments will be explained with reference to accompanying drawings. Note that the present invention is not limited to or by such embodiments. Furthermore, the embodiments can be suitably combined within the scope of the invention.

[a] First Embodiment

Overall Configuration

FIG. 1 is a diagram illustrating a FAQ system according to a first embodiment. As illustrated in FIG. 1, the FAQ system is a system in which a user terminal 1 and a FAQ response device 10 are connected via a network N. This FAQ system is a system in which the FAQ response device 10 receives a query from the user terminal 1 in a chat format and sends back an answer to the query to the user terminal 1. Note that an example of a query includes questions from end users regarding mail orders, online sales, or online games, or the like, and questions from administrators about system failures and so forth. Furthermore, various communications networks, both wired and wireless, may be adopted for the network N, such as the internet or a dedicated line.

The user terminal 1 is an example of a computer device that can be used by a user, and is a personal computer, a smartphone, or the like, for example. The user terminal 1 uses a web browser or a dedicated application to access the FAQ response device 10 and perform query inputting and answer acquisition.

The FAQ response device 10 is an example of a computer device that answers queries inputted from the user terminal 1, and stores a FAQ list in which questions are associated with answers. Upon receipt of access from the user terminal 1, the FAQ response device 10 displays, on the user terminal 1, a chatbot screen which is an example of a web screen in chat format. Further, the FAQ response device 10 outputs, on the chatbot screen, a message such as "How can I help?", and receives a query from the user terminal 1.

Thereafter, the FAQ response device 10 receives, via the chatbot screen, "smartphone has suddenly failed . . . " as a query from the user terminal 1. Thus, the FAQ response device 10 specifies "suddenly" and "smartphone" and so forth as keywords contained in the received query "smartphone has suddenly failed . . . ", and retrieves questions associated with the keywords from the FAQ list.

The FAQ response device 10 then filters the questions from the FAQ list, and outputs, on the chatbot screen, two filtered question candidates which are "1. Emergency support . . . " and "2. Outdoor . . . ". Thereafter, when "1. Emergency support . . . " is selected by the user from among the two question candidates", the FAQ response device 10 acquires an answer "lock function . . . ", which is associated with the selected question, from the FAQ list, and outputs the response on the chatbot screen. It is thus possible to provide an environment in which the FAQ response device 10 is capable of answering an inquiry with any user timing irrespective of business hours and so forth.

In such a system, the FAQ response device 10 evaluates a received query using vectors to evaluate whether the query is an appropriate query containing adequate information from a 5W1H perspective (when, where, who, why, what, and how). Further, the FAQ response device 10 makes, in response to a user query, an additional information inquiry to the user in order to obtain missing information among the 5W1H from the user, and receives an additional question from the user. Thus, by adding a query in addition to an initial query from the user, the FAQ response device 10 retrieves a FAQ query, and by presenting this answer text to the user, affords a more accurate maximum likelihood.

Function Configuration

Next, the function configuration of the FAQ system according to the first embodiment will be described. Note that the user terminal 1 has a configuration similar to that of a general computer device, and hence a detailed description thereof is omitted. FIG. 2 is a functional block diagram illustrating a function configuration of the FAQ response device 10 according to the first embodiment. As illustrated in FIG. 2, the FAQ response device 10 has a communication unit 11, a storage unit 12, and a control unit 20.

The communication unit 11 is a processor for controlling communications with the user terminal 1 and is a communication interface or the like, for example. For example, the communication unit 11 establishes communication with the user terminal 1 through web communications or a chatbot and executes data transmission and reception.

The storage unit 12 is an example of a storage device for storing programs and data, and is memory, a hard disk, or the like, for example. This storage unit 12 stores a FAQ list DB 13 and a polarity value DB 14.

The FAQ list DB 13 is a database for storing a FAQ list in which questions are associated with formal answers corresponding to the questions. FIG. 3 is a diagram illustrating an example of information stored in the FAQ list DB 13. As illustrated in FIG. 3, the FAQ list DB 13 stores FAQ in which "FAQ_IDs, categories, questions, and answers" are associated. The "FAQ" stored here are identifiers identifying the FAQ, and "categories" are FAQ categories. "Questions" are content asked by the user and are information which are specified using a keyword search or the like. "Answers" are formal answers to the questions received from the user terminal 1 and are preset according to past cases and so forth.

In the example of FIG. 3, FAQ falling under the category "membership" illustrate the association between the question "membership fee?" and the answer "the membership fee is 1000 yen per month." That is, when the question "membership fee?" is received from the user, the answer "the membership fee is 1000 yen per month." is sent back. Furthermore, when "membership fee" and "per month", or the like, are inputted by the user as keywords, the question "membership fee?" is retrieved as a question candidate for which the keywords are contained in the question or answer.

The polarity value DB 14 is a database that stores intermediate values of polarity values or the like which are calculated in question evaluation processing by a FAQ processor 22, described subsequently. Note that the polarity value DB 14 is also capable of storing only the latest information and of storing the intermediate values in chronological order.

The control unit 20 is a processor that governs the whole FAQ response device 10 and is a processor or the like, for example. This control unit 20 has a screen control unit 21 and the FAQ processor 22. Note that the screen control unit 21 and the FAQ processor 22 are an example of an electronic circuit such as a processor and an example of processes executed by the processor.

The screen control unit 21 is a processor that executes control of the chatbot screen with the user terminal 1. For example, upon receiving access to the FAQ system from the user terminal 1, the screen control unit 21 transmits a chatbot screen 30 illustrated in FIG. 4 to the user terminal 1. Further, the screen control unit 21 executes the reception of inquiries via the chatbot screen 30 and the outputting of answers, and so forth.

Figure 4:
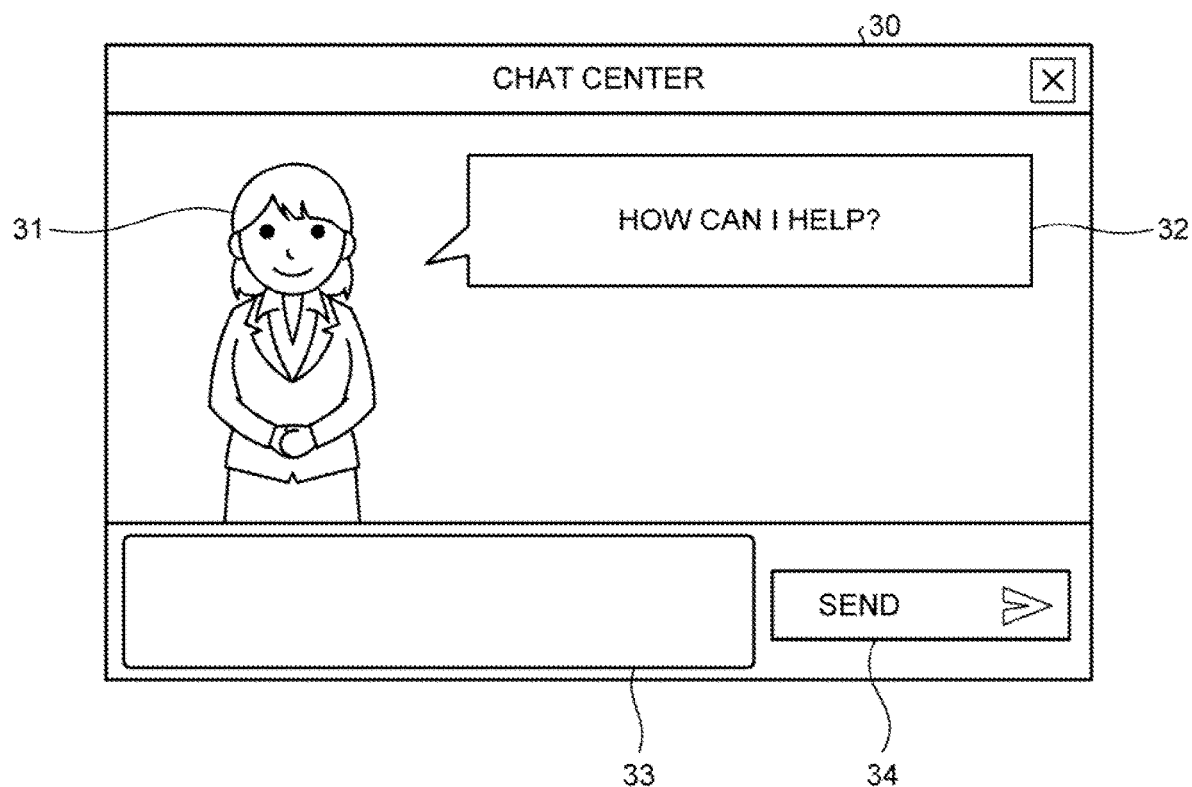
FIG. 4 is a diagram illustrating an example of a chatbot screen.

FIG. 4 is a diagram illustrating an example of the chatbot screen 30. As illustrated in FIG. 4, the chatbot screen 30 includes an avatar 31, a chat region 32, an input region 33, and a send button 34. The avatar 31 is a character that operates so as to answer inquiries from the user. The chat region 32 is a region in which answers including messages and the like from the FAQ response device 10 and inquiries including messages and the like inputted from the user terminal 1 are displayed by being outputted in the order in which same are inputted. The input region 33 is a region to which the user inputs inquiries and the like via the user terminal 1. The send button 34 is a button with which the outputting of inquiries and the like inputted to the input region 33 to the chat region 32 is executed.

The FAQ processor 22 is a processor that has a vector operation unit 23, a conversion unit 24, an evaluation unit 25, an inquiry unit 26, and a response unit 27, and that sends back FAQ which correspond to questions from the user terminal 1. Note that the screen control unit 21 is an example of a reception unit, the vector operation unit 23 and conversion unit 24 are an example of a conversion unit and an acquisition unit, and the evaluation unit 25 is an example of an evaluation unit.

The vector operation unit 23 is a processor that executes a vector operation on all the words contained in a query received from the user terminal 1. For example, the vector operation unit 23 executes a word coding in which words are extracted from the query by performing morphological analysis or the like on the query. The vector operation unit 23 then executes a vector operation on the words (word codes). That is, the vector operation unit uses Word2Vec for each word code to generate 200-dimensional word vectors in which the elements are the polarities from $V_1$ to $V_{200}$, and generates graphs from the vectors of each dimension. The vector operation unit 23 then outputs the word vectors corresponding to each of the words to the conversion unit 24.

The conversion unit 24 is a processor that converts the word codes of the words to polarity values for 5W1H on the basis of the word vectors corresponding to each of the words. More specifically, the conversion unit 24 acquires, from the vector operation unit 23, the graph of word vectors corresponding to each of the words, and applies conversion formulas for handling the respective 5W1H elements to calculate polarity values which are vector values for the respective 5W1H elements.

For example, for a graph of word vectors corresponding to a word A, the conversion unit 24 applies formula (1) to calculate a when polarity value $V_{when}$, applies formula (2) to calculate a where polarity value $V_{where}$, applies formula (3) to calculate a who polarity value $V_{who}$, applies formula (4) to calculate a why polarity value $V_{why}$, applies formula (5) to calculate a what polarity value $V_{what}$, and applies formula (6) to calculate a how polarity value $V_{how}$.

$$V_{when} = \sum_{i=1}^{200} \alpha_i V_i \quad (1)$$

$$V_{where} = \sum_{i=1}^{200} \beta_i V_i \quad (2)$$

$$V_{who} = \sum_{i=1}^{200} \gamma_i V_i \quad (3)$$

$$V_{why} = \sum_{i=1}^{200} \delta_j V_i \quad (4)$$

$$V_{what} = \sum_{i=1}^{200} c_i V_i \quad (5)$$

$$V_{how} = \sum_{i=1}^{200} z_i V_i \quad (6)$$

Figure 5:
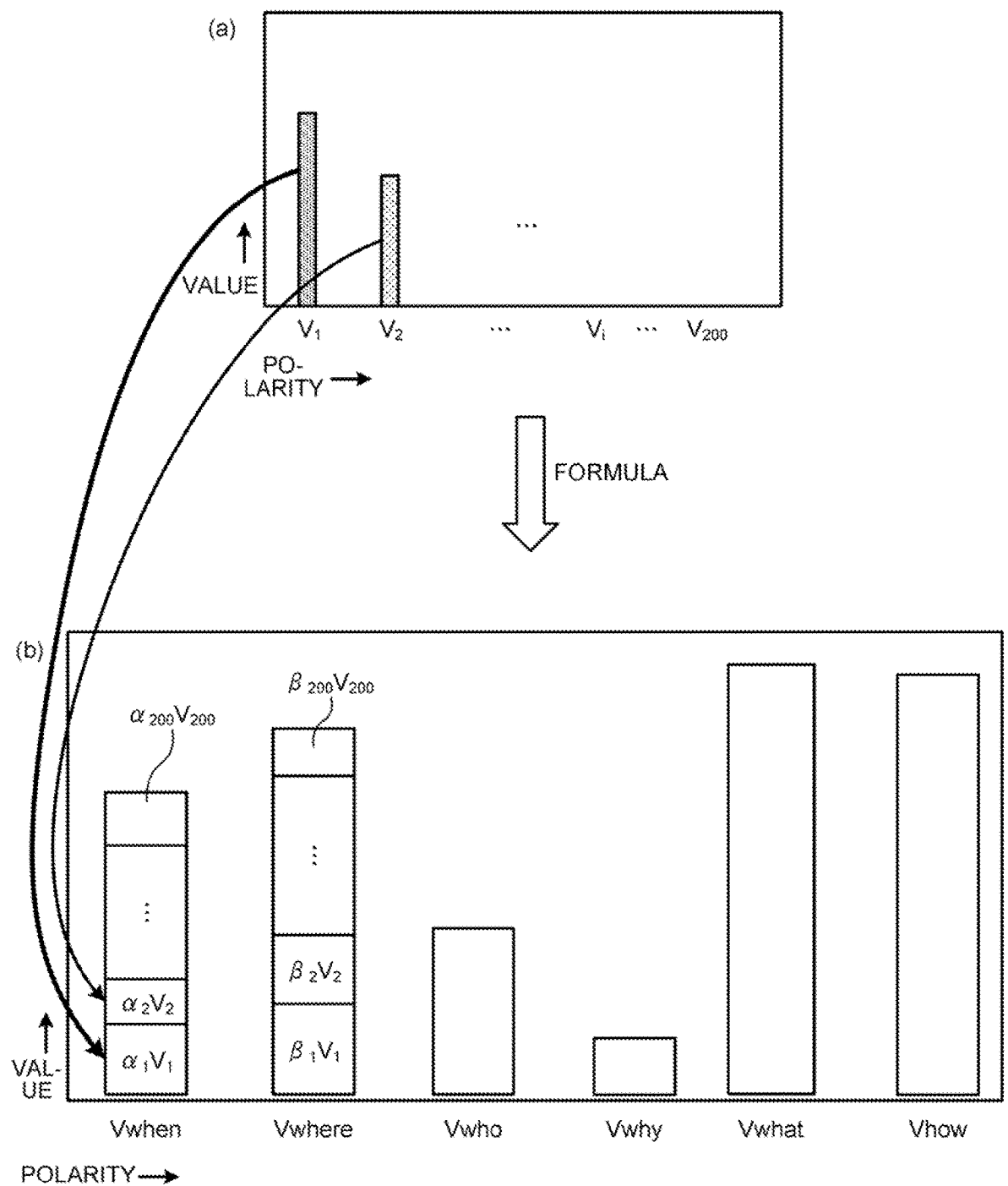
FIG. 5 is a diagram illustrating a polarity value calculation example.

FIG. 5 is a diagram illustrating a polarity value calculation example. (a) of FIG. 5 illustrates word vectors corresponding to a word code (word A) calculated by the vector operation unit 23 and is a graph of 200-dimensional vector values in which the elements are the polarities from $V_1$ to $V_{200}$. Further, when calculating the polarity value $V_{when}$, the conversion unit 24 uses formula (1) to multiply each vector value by $\alpha_i$, and adds the multiplied values to calculate the polarity value $V_{when}$. For example, the conversion unit 24 calculates "$(V_1 \times \alpha_1)+(V_2 \times \alpha_2)+ \ldots +(V_{200} \times \alpha_{200})$" as the polarity value $V_{when}$.

Further, when calculating the polarity value $V_{where}$, the conversion unit 24 uses formula (2) to multiply each vector value by $\beta_i$, and adds the multiplied values to calculate the polarity value $V_{where}$. For example, the conversion unit 24 calculates "$(V_1 \times \beta_1)+(V_2 \times \beta_2)+ \ldots +(V_{200} \times \beta_{200})$" as the polarity value $V_{where}$.

The conversion unit 24 uses the same method to calculate each 5W1H polarity value for word A. The conversion unit 24 thus calculates each 5W1H polarity value for each word contained in a query and outputs the calculation results to the evaluation unit 25. Note that coefficients α, β, γ, δ, c, and z in formulas (1) to (6) are predefined values which will be described in detail subsequently.

Returning to FIG. 2, the evaluation unit 25 is a processor that uses the calculation results by the conversion unit 24 to evaluate the query. More specifically, the evaluation unit 25 calculates, for the respective 5W1H elements, a total value (total vector) by adding the polarity values of all the words contained in the query.

For example, when a word A, a word B, and a word C are extracted from a query, the evaluation unit 25 calculates, as the $V_{when}$ of the query, "$V_{when}$ of word A+$V_{when}$ of word B+$V_{when}$ of word C". Similarly, the evaluation unit 25 calculates "$V_{where}$ of word A+$V_{where}$ of word B+$V_{where}$ of word C" as the $V_{where}$ of the query, calculates "$V_{who}$ of word A+$V_{who}$ of word B+$V_{who}$ of word C" as the $V_{who}$ of the query, calculates "$V_{why}$ of word A+$V_{why}$ of word B+$V_{why}$ of word C" as the $V_{why}$ of the query, calculates "$V_{what}$ of word A+$V_{what}$ of word B+$V_{what}$ of word C" as the $V_{what}$ of the query, and calculates "$V_{how}$ of word A+$V_{how}$ of word B+$V_{how}$ of word C" as the $V_{how}$ of the query.

Figure 6:
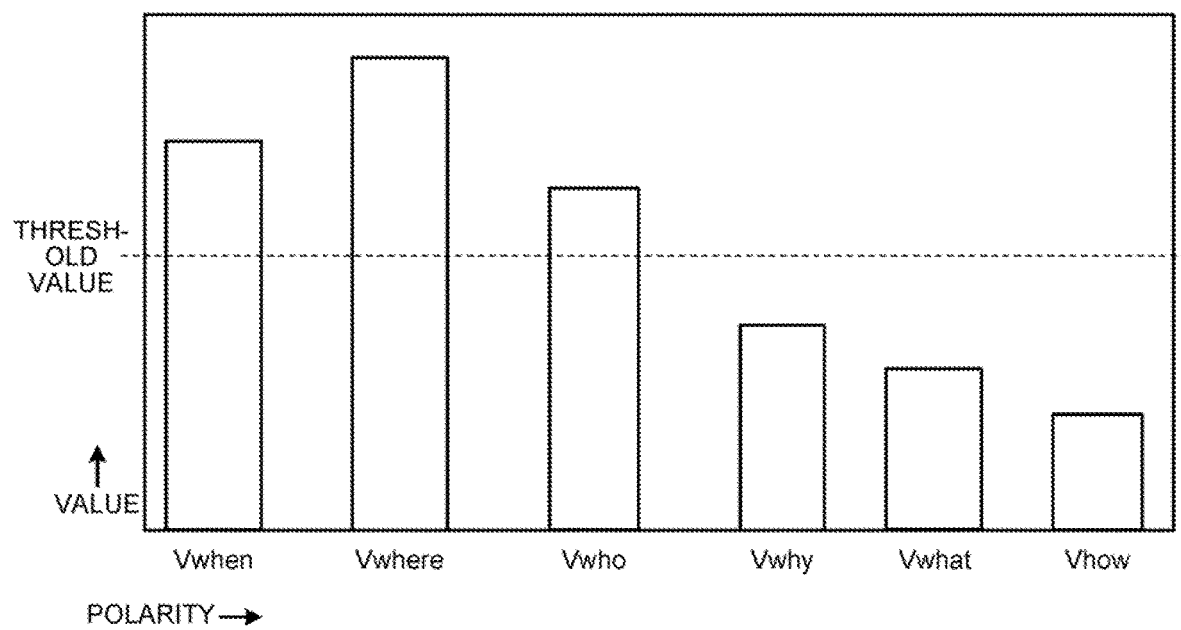
FIG. 6 is a diagram illustrating a query evaluation example.

Further, when the respective 5W1H total values exceed a threshold value, the evaluation unit 25 determines that the query is appropriate, and when a total value which is less than the threshold value is present, determines that the query is missing information. FIG. 6 is a diagram illustrating a query evaluation example. In the case of FIG. 6, although the polarity values $V_{when}$, $V_{where}$, and $V_{who}$ exceed the threshold value, because the polarity values $V_{why}$, $V_{what}$, and $V_{how}$ do not exceed the threshold value, the evaluation unit 25 determines that the query is missing information.

The inquiry unit 26 is a processor that asks the user an additional question on the basis of query evaluation results by the evaluation unit 25. More specifically, the inquiry unit 26 asks the user, via the chatbot, about an item which corresponds to a polarity value for which it has been determined, according to the evaluation results, that the polarity value is less than the threshold value. The inquiry unit 26 then generates one new query which is obtained by combining the query first inputted with information (a question) that is additionally inputted. Thereafter, the inquiry unit 26 outputs the new query thus generated to the vector operation unit 23 so as to cause the foregoing processing to be executed.

In the example of FIG. 6, because the polarity values $V_{why}$, $V_{what}$, and $V_{how}$ do not exceed the threshold value, the inquiry unit 26 issues an inquiry to the user regarding "why", "what", and "how". Note that the content of the question can also be configured for each of the 5W1H elements, and the words contained in the initial query can also be combined and generated automatically.

For example, when an initial query is "my smartphone has failed" and an additional question item is "how", the inquiry unit 26 generates, as an additional question, "what kind of operation has failed?" or "in what way has it failed?", and so forth. In addition, when an initial query is "my smartphone has failed" and an additional question item is "what", the inquiry unit 26 generates, as an additional question, "in what way has the smartphone failed?" and so forth.

The response unit 27 is a processor that sends back a FAQ answer which corresponds to a question from the user. More specifically, keywords and the like are extracted from a query which has been determined by the evaluation unit 25 to be appropriate, retrieves questions which fall under the keywords and the like from the FAQ list DB 13, and questions the user by displaying the questions via the chatbot as question candidates. The response unit 27 subsequently acquires, from the FAQ list DB 13, an answer corresponding to a question selected from among the question candidates and displays the same via the chatbot as an answer to the question.

Specific Example of Evaluation

Figure 7:
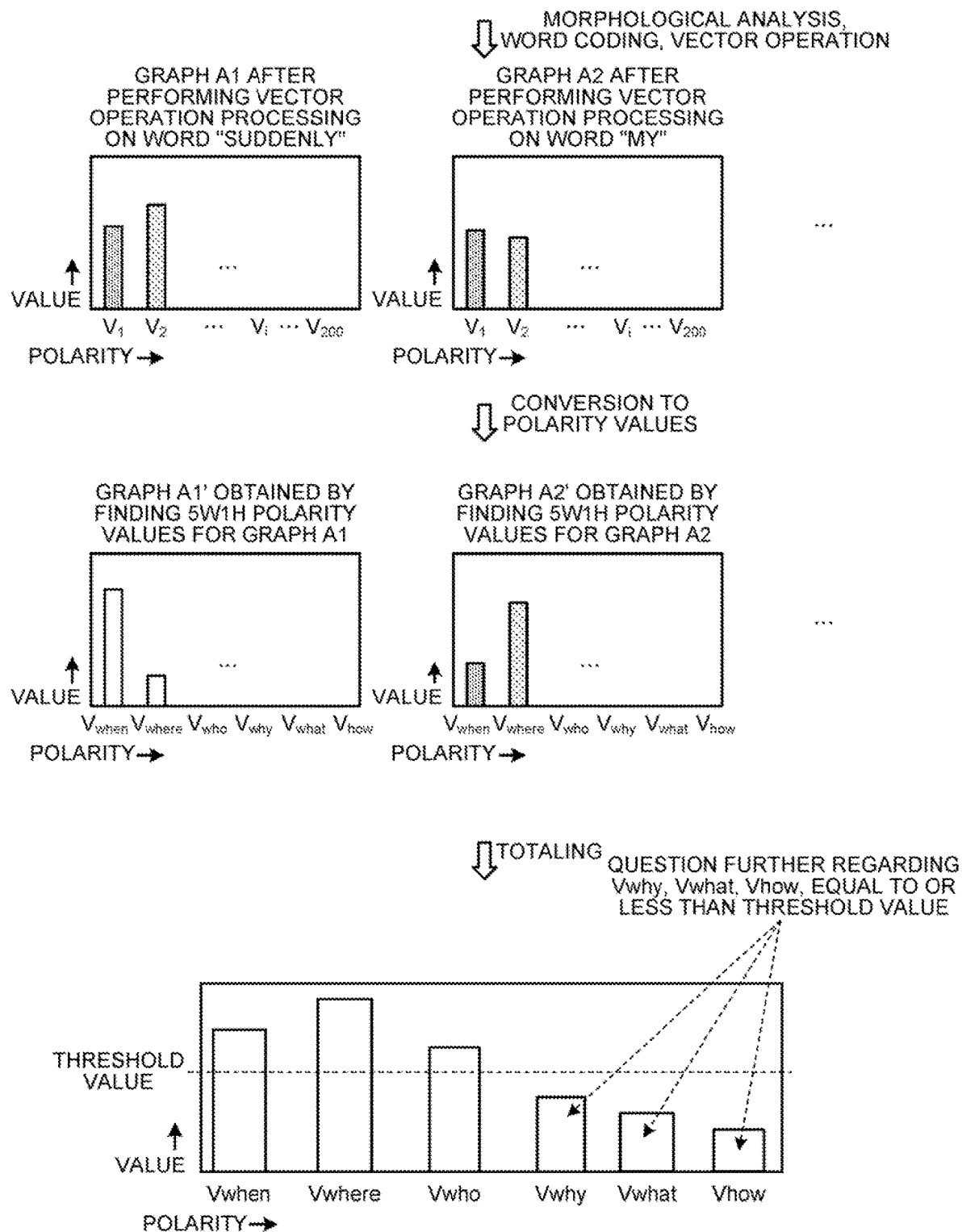
FIG. 7 is a diagram illustrating a specific example of a query evaluation.

FIG. 7 is a diagram illustrating a specific example of a query evaluation. As illustrated in FIG. 7, the FAQ processor 22 receives a query A "My smartphone has suddenly failed." via the chatbot. In so doing, the FAQ processor 22 performs a morphological analysis, word coding, and a vector operation on the query A "My smartphone has suddenly failed."

As a result, the FAQ processor 22 generates a graph A1 after performing vector operation processing on the word "suddenly" and generates a graph A2 after performing vector operation processing on the word "my". Thus, the FAQ processor 22 generates graphs of 200-dimensional vectors for each of the words contained in the query A.

Thereafter, the FAQ processor 22 uses graph A1 and formulas (1) to (6) to generate a graph A1' which is obtained by finding 5W1H polarity values for graph A1. Likewise, the FAQ processor 22 uses graph A2 and formulas (1) to (6) to generate a graph A2' which is obtained by finding 5W1H polarity values for graph A2. Thus, the FAQ processor 22 generates graphs of 5W1H vectors for each of the words contained in the query A.

Further, the FAQ processor 22 calculates a total value by adding, for each 5W1H element, the 5W1H vectors (polarity values) for each of the words. Thereafter, the FAQ processor 22 compares each 5W1H total value with the threshold value and determines that the items $V_{why}$, $V_{what}$, and $V_{how}$, for which the total value is less than the threshold value, are each missing. As a result, the FAQ processor 22 questions the person asking the question further regarding $V_{why}$, $V_{what}$, and $V_{how}$. Further, the FAQ processor 22 generates a new query which is obtained by combining the initial query A with a response from the person asking the question to the further questioning, and repeats the foregoing processing.

Specific Example of Screen Transitions

Figure 8:
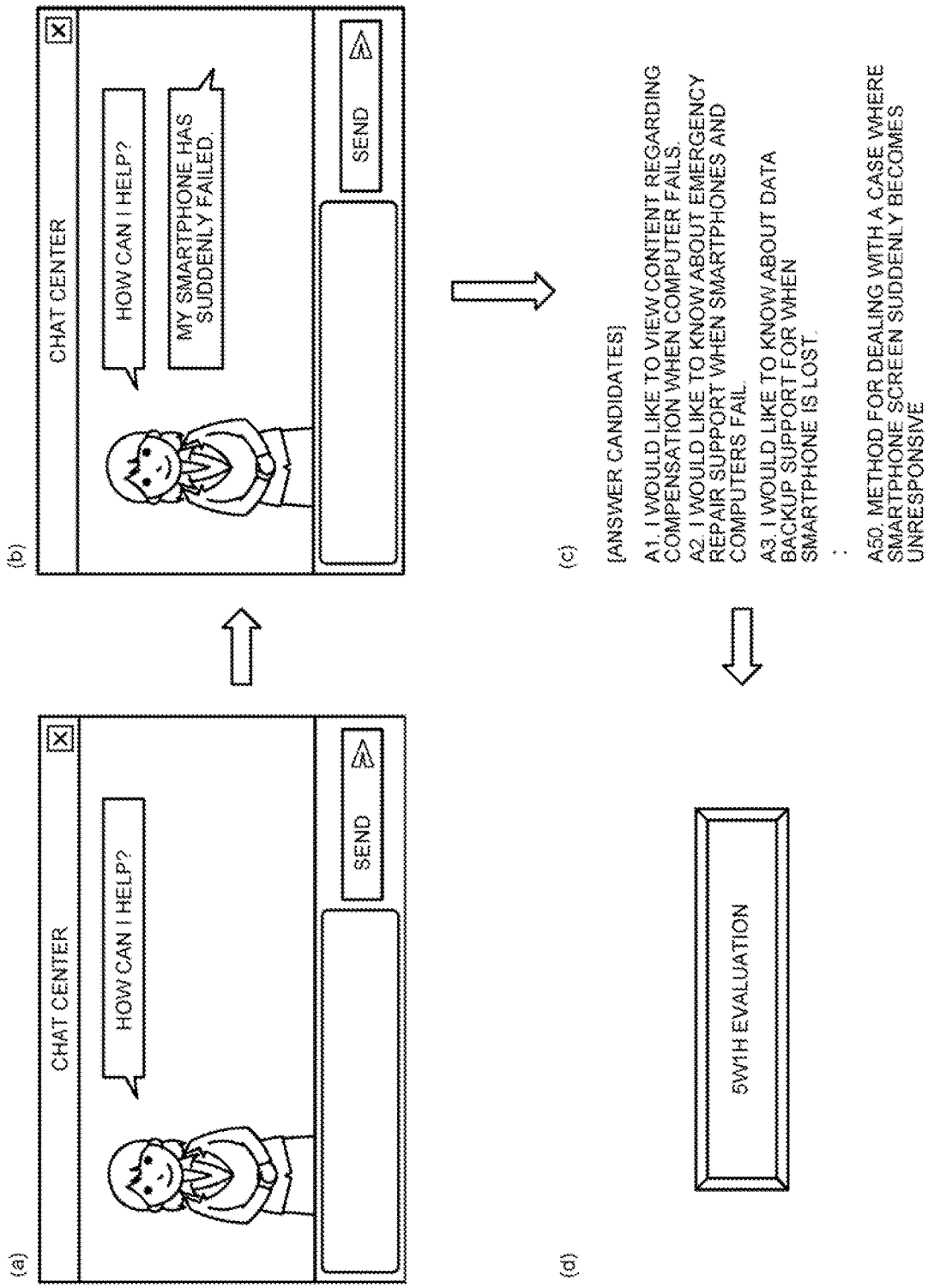
FIG. 8 is a diagram illustrating the process from receipt of a question up to a query evaluation.

Screen transitions illustrating the process from receipt of a question and up until an answer is sent back will be described next. FIG. 8 is a diagram illustrating the process from receipt of a question and up to a query evaluation, and FIG. 9 is a diagram illustrating the process from an additional inquiry and up to a response.

As illustrated in FIG. 8, the FAQ response device 10 displays a chatbot screen on the user terminal 1 which has been granted access, outputs a message such as "How can I help?" on the chatbot screen, and receives a query from the user terminal 1 (see (a) of FIG. 8).

Thereafter, the FAQ response device 10 receives the query A "My smartphone has suddenly failed." via the chatbot (see (b) of FIG. 8). The FAQ response device 10 then uses query A to retrieve FAQ and specifies "A1 to A50" as answer candidates (see (c) of FIG. 8). However, because answer candidates equal to or greater than a threshold value (three, for example) are retrieved, the FAQ response device 10 executes a 5W1H evaluation of query A in order to filter the answer candidates (see (d) of FIG. 8).

Figure 9:
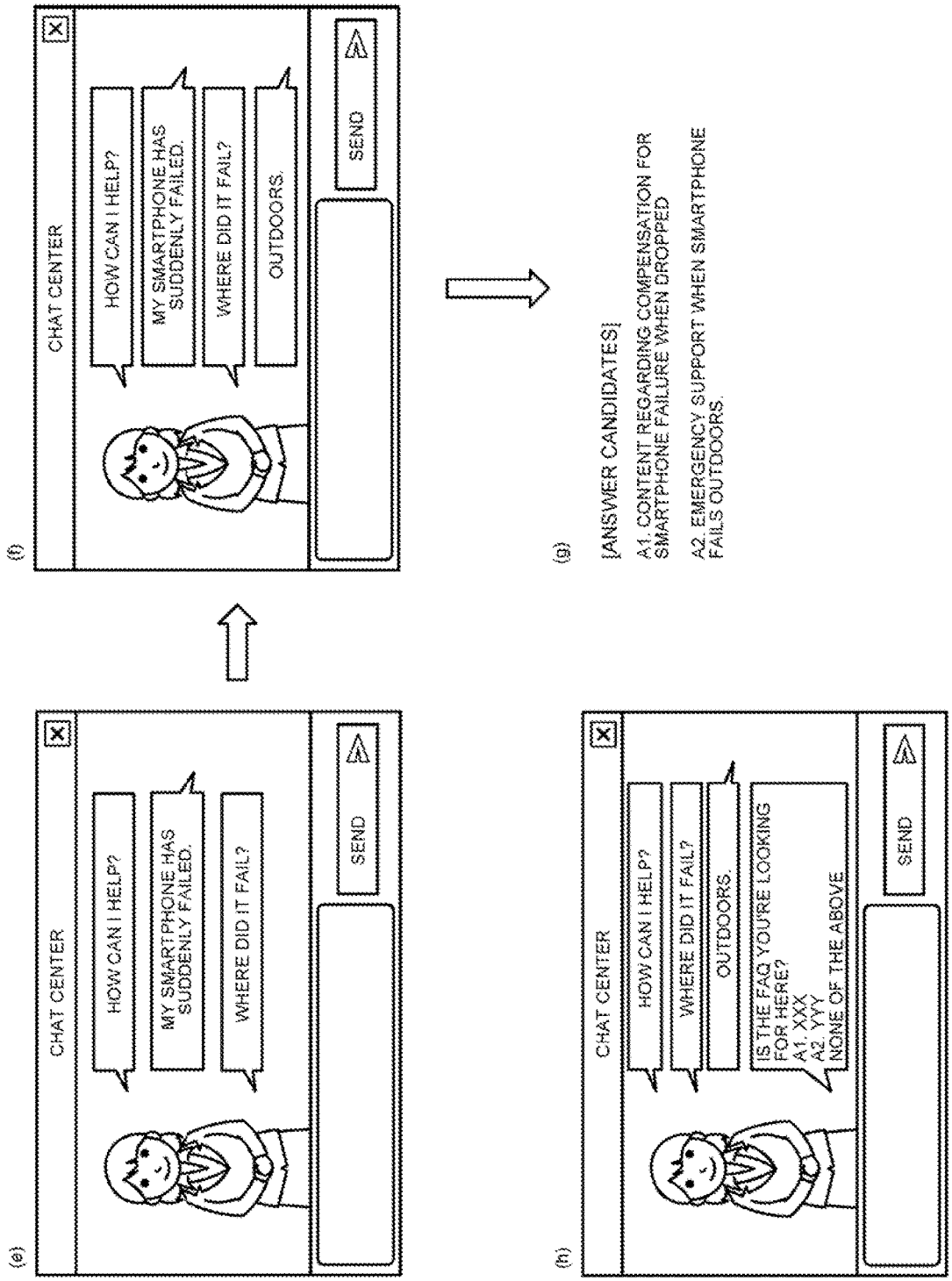
FIG. 9 is a diagram illustrating the process from an additional inquiry up to a response.

Thereafter, the FAQ response device 10 specifies that "where" is missing according to the 5W1H evaluation and therefore outputs a message such as "Where did it fail?" on the chatbot screen, and receives an additional query from the user terminal 1 (see (e) of FIG. 9).

The FAQ response device 10 then receives an additional query B "Outdoors." via the chatbot (see (f) of FIG. 9). At such time, the FAQ response device 10 uses a query AB, which is obtained by adding the additional query B to the initial query A, to retrieve FAQ and specifies "A1 and A2" as answer candidates (see (g) of FIG. 9). Because answer candidates less than the threshold value (three, for example) have been retrieved, the FAQ response device 10 then displays the retrieved answer candidates on the chatbot screen (see (h) of FIG. 9).

Thereafter, when answer candidate "A1" or "A2" is selected, the FAQ response device 10 acquires the corresponding answer from the FAQ list DB 13 and displays the same on the chatbot screen. On the other hand, when "none of the above." is selected among the answer candidates, the FAQ response device 10 displays, on the chatbot screen, a message to the effect that the corresponding FAQ is not present and ends the processing.

Flow of Processing

Figure 10:
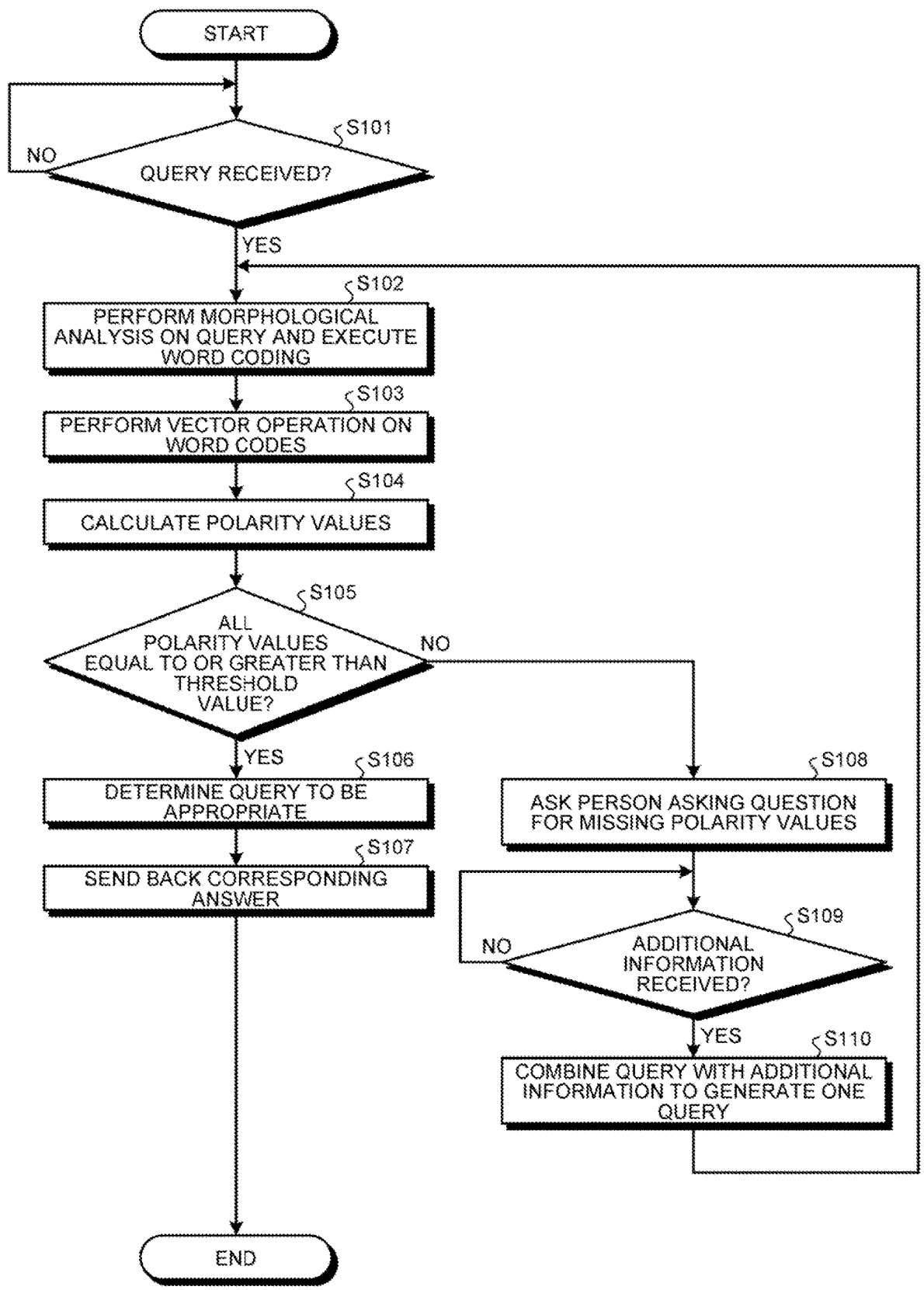
FIG. 10 is a flowchart illustrating the flow of processing.

FIG. 10 is a flowchart illustrating the flow of processing. As illustrated in FIG. 10, when a query is received (S101: Yes), the vector operation unit 23 performs a morphological analysis on the query to extract words, and uses Word2Vec or the like to generate word codes for each of the words (S102). Thereafter, the vector operation unit 23 performs a vector operation on the word codes of each of the words to generate 200-dimensional vectors (S103).

The conversion unit 24 then calculates 5W1H polarity values (S104). That is, the conversion unit 24 uses formulas (1) to (6) to calculate 5W1H-dimensional vector values from the 200-dimensional vector values of each of the word codes and adds the vector values of all the words of the query for the respective 5W1H elements.

Thereafter, when all the polarity values are equal to or greater than the threshold value (S105: Yes), the evaluation unit 25 determines the query to be appropriate (S106). The response unit 27 then responds by retrieving answers that correspond to the query from the FAQ list DB 13 (S107).

On the other hand, when any of the polarity values is not equal to or greater than the threshold value (S105: No), the inquiry unit 26 further questions the person asking the question in order to obtain the missing information (polarity value) among the 5W1H elements (S108). Thereafter, upon receiving a response (additional information) to the further questioning of the person asking the question (S109: Yes), the inquiry unit 26 generates one query in which the query and the additional information are combined (S110). S102 and subsequent steps are then executed.

Advantageous Effects

As mentioned earlier, when undertaking a chat with a user in a one-to-one format by using a chatbot, the FAQ response device 10 is capable of using a query that has been inputted by the user to retrieve a registered FAQ query and of presenting this response text to the user. Further, even when adequate 5W1H-related information is not contained in the query from the user, the FAQ response device 10 is capable of suitably discriminating which information is missing.

Thus, the FAQ response device 10 is capable of improving the accuracy of an inquiry that relates to supplementing a query and that is directed toward the person asking the question. Furthermore, because the FAQ response device 10 executes FAQ retrieval by using a supplemented query, the question content from the user can be suitably determined and the response accuracy can also be improved.

[b] Second Embodiment

Although the embodiments of the present invention have been described thus far, the present invention may be carried out using a variety of different embodiments other than the foregoing embodiments.

Coefficient Setting

The coefficients in the foregoing formulas (1) to (5) can be calculated and set in advance. For example, the FAQ response device 10 prepares a query X which is balanced in terms of 5W1H. From there, the FAQ response device 10 determines one optional element among the 5W1H elements and removes all words containing this element. In addition, the FAQ response device 10 represents each of the queries before and after word removal in a graph of 200-dimensional vectors, and uses the differences in the respective polarity values as coefficients. Hence, the coefficient values differ according to each vector, and there is also a vector for which $\alpha_i=0$.

Figure 11:
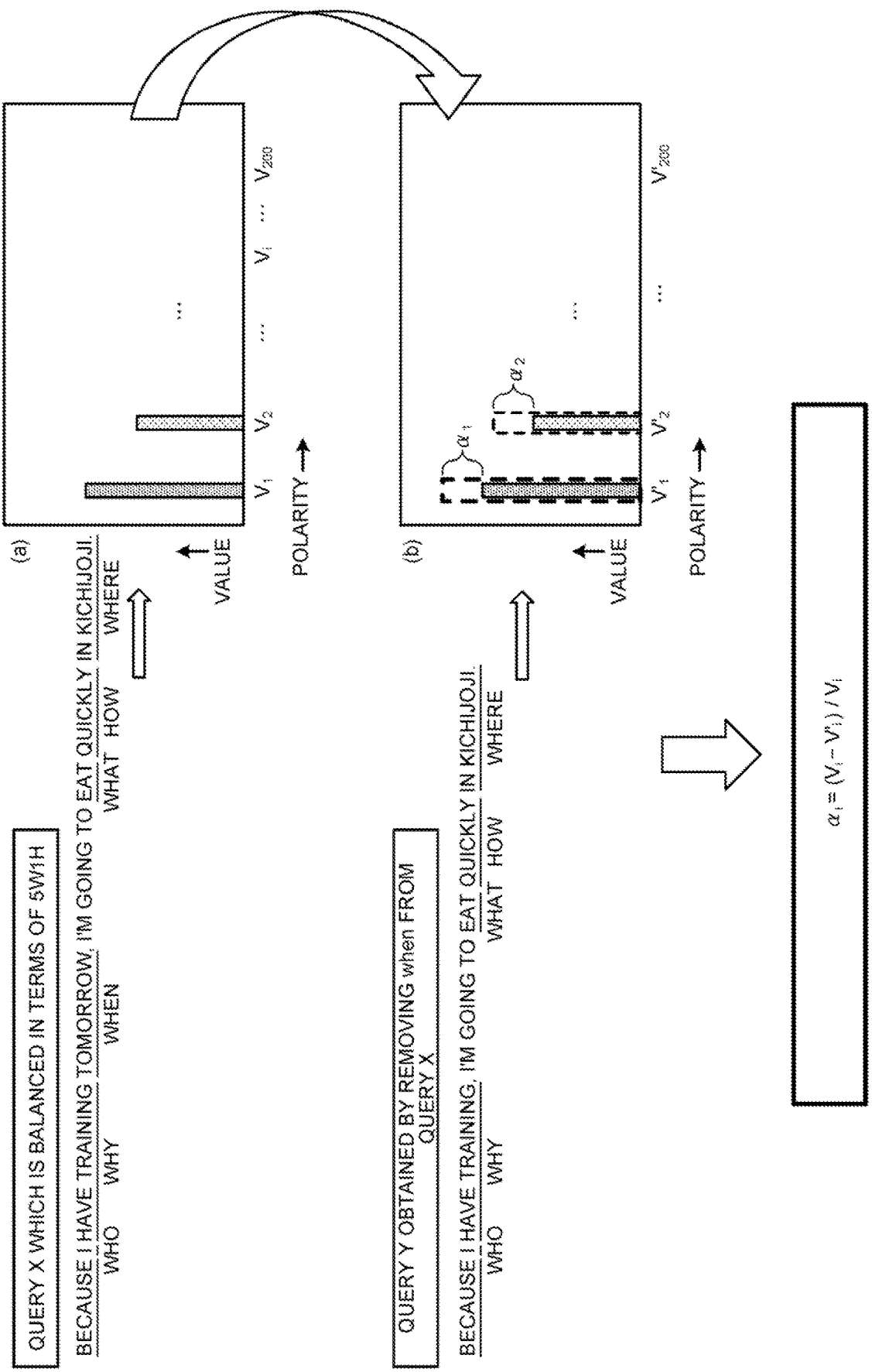
FIG. 11 is a diagram illustrating an example of a coefficient calculation method.

Here, a coefficient $\alpha$ of formula (1) corresponding to $V_{when}$ is described by way of an example. FIG. 11 is a diagram illustrating an example of a coefficient calculation method. As illustrated in FIG. 11, the FAQ response device 10 performs 200-dimensional vector conversion for each word code in query X "Because I have training tomorrow, I'm going to eat quickly in Kichijoji." which is balanced in terms of 5W1H, and adds the vectors in the respective dimensions to generate the vector graphs ($V_1$ to $V_{200}$) illustrated in (a) of FIG. 11.

Thereafter, the FAQ response device 10 generates a query Y "Because I have training, I'm going to eat quickly in Kichijoji." which is obtained by removing "when" from query X. The FAQ response device 10 then performs 200-dimensional vector conversion for each word code in query Y, and adds the vectors in the respective dimensions to generate the vector graphs ($V'_1$ to $V'_{200}$) illustrated in (b) of FIG. 11.

3 The FAQ response device 10 then calculates, as a coefficient $\alpha_i$ (i=1 to 200), the percentage of decrease for each of the dimensions ($V_1$ to $V_{200}$). That is, the FAQ response device 10 calculates "$\alpha_i=(V_i-V'_i)/V_i$". Note that processing like that for "when" above is executed by generating a query with "where" removed in the case of coefficient $\beta$, a query with "who" removed in the case of coefficient $\gamma$, a query with "why" removed in the case of coefficient $\delta$, a query with "what" removed in the case of coefficient c, and a query with "how" removed in the case of coefficient z. As a result, accurate coefficients can be calculated and accurate vector conversion can be executed, and hence response accuracy also improves.

Web Page

Although an example in which a chatbot is used was described in the foregoing embodiments, the present invention is not limited to or by such embodiments, and a general web browser, or the like, can also be used, for example. Furthermore, the present invention is not limited to the internet or the like, rather, an intranet or the like can also be adopted. For example, the present invention is not limited to general user FAQ and could also be applied to company FAQ.

Vector Conversion

Although vector conversion using Word2Vec is described by way of example in the foregoing embodiments, the present invention is not limited to or by such conversion, rather, another well-known technology may be used. Furthermore, the present invention is not limited to 200 dimensions, rather, a number of dimensions suited to the vector conversion technique which is adopted can be used. Moreover, although examples have been described in the foregoing embodiments in which formulas are used for conversion to polarity values which are an example of element values, the present invention is not limited to or by such examples. For example, a conversion table in which correspondence between each of the 5W1H polarity values and the total values of 200-dimensional vectors has been preset, or the like, may also be employed. Furthermore, instead of performing an evaluation by using all the 5W1H elements, at least one polarity value can be adopted, and a query can be evaluated according to whether or not the adopted polarity value is equal to or greater than a threshold value.

Evaluation Timing

Further, the foregoing query evaluation may be executed only when it is not possible to retrieve an answer which corresponds to an initial query or when answer candidates equal to or greater than a threshold value are present, or may be executed for all the queries. Furthermore, the aforementioned appropriate question is an example of an answerable question, and a question which does not correspond to an appropriate question and for which an inquiry has been made is an example of an unanswerable question.

Applied Examples

Although a FAQ system that answers questions from a user has been described by way of example in the foregoing embodiments, the present invention is not limited to or by such a FAQ system. For example, the present invention may also be applied to questionnaire completion or to a search when handling a fault in which a system error message is associated with error handling.

System

Information that includes the processing procedures, control procedures, specific names, and various data and parameters, as appearing in the foregoing documents and drawings, can be optionally changed except where special mention is made. In addition, specific examples, distributions, and numerical values, and the like, as described in the embodiments, are merely an example, and can be optionally changed.

Furthermore, the constituent elements of the respective devices illustrated are functionally conceptual and are not always physically constituted as per the drawings. In other words, the specific embodiments in terms of the distribution or integration of the devices are not limited to or by those illustrated. In other words, some or all of the devices may be constituted by being functionally or physically divided or integrated using optional units according to the various loads and usage statuses, or the like. In addition, all or an optional portion of the processing functions carried out by the devices can be realized by a CPU or by a program which is analyzed and run by the CPU, or can be implemented as hardware using wired logic.

Hardware

Figure 12:
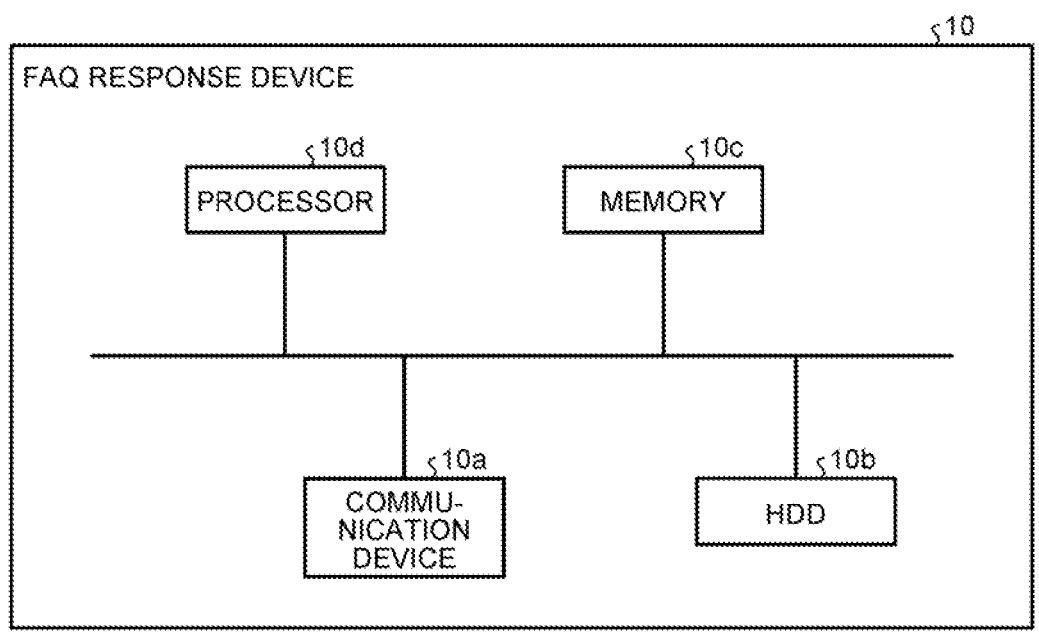
FIG. 12 is a diagram illustrating a hardware configuration example.

FIG. 12 is a diagram illustrating a hardware configuration example. As illustrated in FIG. 12, the FAQ response device 10 has a communication device 10a, a hard disk drive (HDD) 10b, memory 10c, and a processor 10d. Further, the parts illustrated in FIG. 12 are interconnected via a bus or the like.

The communication device 10a is a network interface card, or the like, that communicates with another server. The HDD 10b stores programs and DBs for operating the functions illustrated in FIG. 2.

The processor 10d causes a process to operate that executes the functions illustrated in FIG. 2 or the like and so forth by reading out, from an HDD 10b or the like, a program for executing the same processing as the processors illustrated in FIG. 2, and by decompressing the program in a memory 10c. That is, this process executes the same functions as the processors of the FAQ response device 10. More specifically, the processor 10d reads out, from the HDD 10b or the like, a program which has the same functions as the screen control unit 21, the FAQ processor 22, and the like. The processor 10d then executes a process that executes the same processing as the screen control unit 21, the FAQ processor 22, and the like.

Thus, the FAQ response device 10 operates as an information processing device that executes an evaluation method by reading out and executing a program. Furthermore, the FAQ response device 10 is also capable of realizing the same functions as in the foregoing embodiments by using a medium reading device to read out the aforementioned program from a recording medium and executing the program thus read out. Note that the program mentioned in the other embodiments is not limited to being executed by the FAQ response device 10. For example, the present invention can be similarly applied in a case where another computer or a server executes the program or where the program is executed by collaborating with another computer or server.

This program can be distributed via a network such as the internet. Moreover, the program can be executed by being recorded on a computer-readable recording medium such as a hard disk, a flexible disk (FD), a CD-ROM, a magneto-optical disk (MO), or a digital versatile disc (DVD) and by being read out from the recording medium by a computer.

According to the embodiments, the accuracy of an inquiry relating to query supplementation and directed toward a person asking a question can be improved.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An evaluation method comprising:
receiving question information, using a processor;
converting words contained in the received question information into word vectors including a plurality of element values respectively associated with a plurality of elements, using the processor;
referring to a storage unit that stores, in association with the elements, specific information specifying the strength of specific meanings contained within the element values associated with the elements and acquiring, using the specific information, a plurality of semantic information items indicating the strength of the specific meanings respectively contained within the plurality of element values included in the word vectors, using the processor; and
performing an evaluation relating to the received question information on the basis of the acquired plurality of semantic information items, using the processor, wherein,
the acquiring includes, using a plurality of conversion formulas, which perform conversion into a plurality of meanings, acquiring a plurality of vector values indicating the plurality of meanings from the word vectors, and
the performing includes evaluating the question information to be an answerable question when the plurality of vector values are each equal to or greater than a threshold value and evaluating the question information to be an unanswerable question when any of the plurality of vector values is less than the threshold value.

2. An information processing device, comprising:
a memory; and
a processor coupled to the memory and the processor executes a process comprising:
receiving question information;
converting words contained in the received question information into word vectors including a plurality of element values respectively associated with a plurality of elements;
referring to the memory that stores, in association with the elements, specific information specifying the strength of specific meanings contained within the element values associated with the elements and acquire, using the specific information, a plurality of semantic information items indicating the strength of the specific meanings respectively contained within the plurality of element values included in the word vectors; and
performing an evaluation relating to the received question information on the basis of the acquired plurality of semantic information items, wherein the processor further executes the process comprising:
acquiring additional question information by asking a questioner who has inputted the question information a question about content corresponding to the results of the evaluation relating to the question information.

3. The information processing device according to claim 2, wherein,
the converting includes generating new question information which is obtained by combining the question information with the additional question information, extracts words from the new question information, and converting each of the words to the word vectors,
the acquiring includes acquiring the plurality of semantic information items from word vectors of each of the words contained in the new question information, and
the performing includes calculating, for each of the plurality of semantic information items, a cumulative total of the semantic information items acquired from the word vectors of each of the words, and performing an evaluation relating to the question information based on the cumulative total.

4. An information processing device, comprising:
a memory; and
a processor coupled to the memory and the processor executes a process comprising:
receiving question information;

converting words contained in the received question information into word vectors including a plurality of element values respectively associated with a plurality of elements;

referring to the memory that stores, in association with the elements, specific information specifying the strength of specific meanings contained within the element values associated with the elements and acquire, using the specific information, a plurality of semantic information items indicating the strength of the specific meanings respectively contained within the plurality of element values included in the word vectors; and performing an evaluation relating to the received question information on the basis of the acquired plurality of semantic information items, wherein the processor further executes the process comprising:

generating the specific information by using a first word vector corresponding to first question information for which the evaluation is equal to or greater than a threshold value, and a second word vector corresponding to second question information from which, among the words contained in the first question information, a word falling under the specific meaning has been excluded.

* * * * *